(No Model.)

G. P. MORRILL.
AX AND TOOL HANDLE GUARD.

No. 279,582. Patented June 19, 1883.

Witnesses
H. M. Fowler
R. B. Fowler

Inventor
Geo. P. Morrill

UNITED STATES PATENT OFFICE.

GEORGE P. MORRILL, OF CANTERBURY, NEW HAMPSHIRE.

AX AND TOOL HANDLE GUARD.

SPECIFICATION forming part of Letters Patent No. 279,582, dated June 19, 1883.

Application filed March 12, 1883. (No model.)

*To all whom it may concern:*

Be it known that I, GEORGE P. MORRILL, a citizen of the United States, residing at Canterbury, in the county of Merrimac and State of New Hampshire, have invented a new and useful Improvement in Ax and Tool Handle Guards, the nature and objects of which are fully set forth in the following specification and accompanying drawings, in which—

Figure 1:
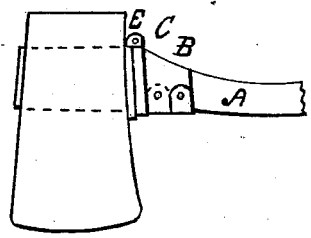
Figure 2:
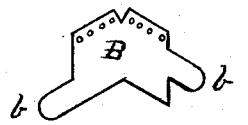
Figure 3:
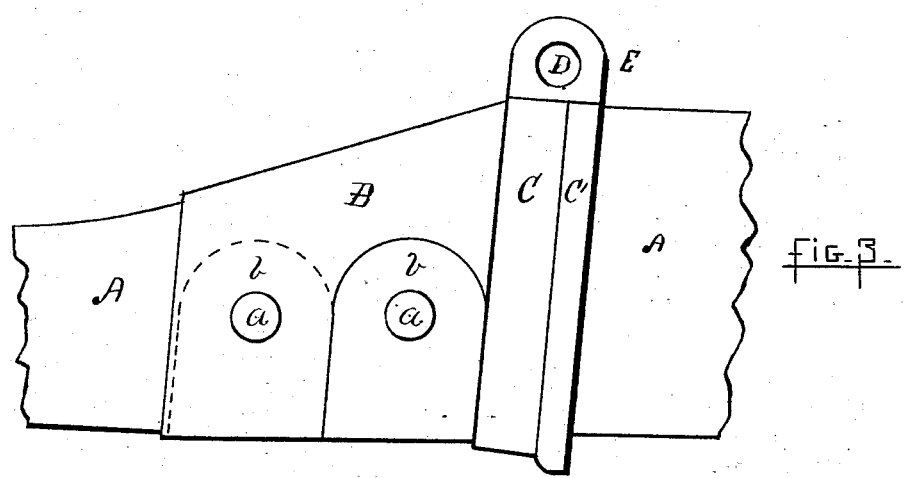
Figure 4:
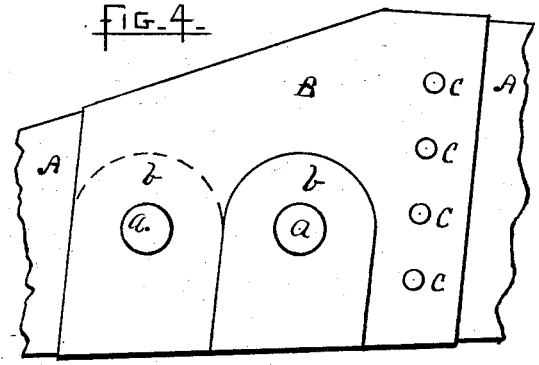
Figure 5:
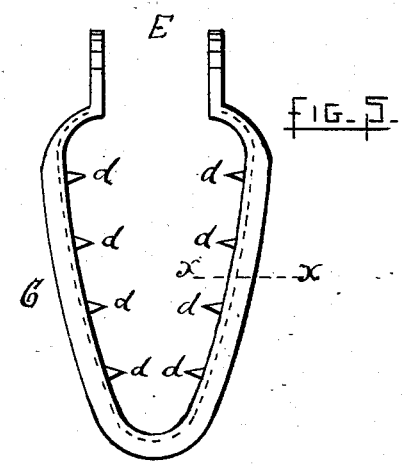
Figure 6:

Figure 1 shows an ax and a portion of the handle with my invention attached. Fig. 2 is a detached view of the sheet-metal plate forming part of the guard. Figs. 3 and 4 represent a portion of an ax-helve, and illustrate the mode of attachment. Fig. 5 is a detached view of the malleable-iron collar, and Fig. 6 is a sectional view of the same.

Similar letters refer to similar parts in the several views.

Around the tapering portion of the ax-helve, immediately back of the ax, I wind the sheet-metal strip B, Fig. 4, which has been cut in the shape shown in Fig. 2, having the tongues $b\ b$, which pass beneath the helve and are turned up on each side and held by the bolts or rivets $a\ a$, which pass entirely through the helve and securely hold the tongues $b\ b$.

In the edge of the sheet-metal strip I place the holes $c\ c\ c$ to receive the teeth $d\ d\ d$ of the malleable-iron collar C, which is placed over the edge of the sheet-metal strip, as shown in Fig. 3. This collar C has lugs E, with holes D, through which I pass a bolt drawing the lugs E together, (not shown in the drawings,) and thereby forcing the teeth $d\ d\ d$ through the holes $c\ c\ c$ and into the wood of the ax-helve.

The sheet-metal band B, inclosing the handle, prevents it from being split or splintered, and by applying it in the manner shown I am able to draw the band B tightly and smoothly around the handle, and securely fasten the same by means of the tongues $b\ b$ and bolts or rivets $a\ a$.

The collar C is made with a rib or shoulder at C', as shown in section in Fig. 6, against which the ax is driven, thereby preventing the ax from working loose on the handle or from slipping on the handle farther than is desired.

The above-described guard is also equally well adapted to a large variety of tool-handles—such as picks, hammers, sledges, &c.—the only modification required being a change of form of the sheet-metal strip B and collar C to suit the peculiar shape of the handle used.

What I claim as my invention, and desire to secure by Letters Patent, is—

1. The combination, with an ax or tool handle, of a guard consisting of a metallic band, B, enveloping the handle, and having at opposite ends and on opposite sides the projecting tongues $b\ b$, so arranged as to pass by each other and fold down upon and over the band itself, and having suitable fastenings either passing into or through the substance of the handle, as and for the purpose set forth.

2. The combination, with an ax or tool handle guard consisting of a metallic band, C, passing around the handle, and immediately behind the ax or tool, of a raised shoulder or rib, C', to prevent the tool from slipping on the handle, as and for the purpose set forth.

3. The tool-handle guard, as described, consisting of collar C, having teeth $d\ d\ d$, and lugs E, with a shoulder, C', and the sheet-metal band B, having tongues $b\ b$ and holes $c\ c$, as and for the purpose set forth.

GEO. P. MORRILL.

Witnesses:
    HARRY G. SARGENT,
    E. H. WOODMAN.